(12) United States Patent
Winger

(10) Patent No.: US 8,170,107 B2
(45) Date of Patent: May 1, 2012

(54) FLEXIBLE REDUCED BANDWIDTH COMPRESSED VIDEO DECODER

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1091 days.

(21) Appl. No.: 12/043,242

(22) Filed: Mar. 6, 2008

(65) Prior Publication Data

US 2009/0225844 A1 Sep. 10, 2009

(51) Int. Cl.
*H04N 11/02* (2006.01)

(52) U.S. Cl. ......... 375/240.16; 375/240.24; 375/E7.104

(58) Field of Classification Search ............. 375/E7.104, 375/E7.211, 240.16, 240.24
See application file for complete search history.

(56) References Cited

U.S. PATENT DOCUMENTS

| | | | | |
|---|---|---|---|---|
| 5,724,446 A | * | 3/1998 | Liu et al. | 382/233 |
| 8,040,951 B2 | * | 10/2011 | Kitada et al. | 375/240.16 |
| 2005/0038842 A1 | * | 2/2005 | Stoye | 708/306 |
| 2005/0190844 A1 | * | 9/2005 | Kadono et al. | 375/240.16 |
| 2006/0146935 A1 | * | 7/2006 | Winger | 375/240.17 |
| 2006/0165176 A1 | * | 7/2006 | Raveendran et al. | 375/240.16 |
| 2006/0227880 A1 | * | 10/2006 | Gordon et al. | 375/240.25 |
| 2008/0025390 A1 | * | 1/2008 | Shi et al. | 375/240.02 |
| 2009/0135901 A1 | * | 5/2009 | Au et al. | 375/240.02 |

* cited by examiner

*Primary Examiner* — Man Phan
*Assistant Examiner* — Ryan Kavleski
(74) *Attorney, Agent, or Firm* — Christopher P. Maiorana, PC

(57) ABSTRACT

A method of decoding a video bitstream is disclosed. The method generally includes the steps of (A) buffering the video bitstream in a main memory, the video bitstream comprising a first residual block based on a first motion compensated block, the first motion compensated block having been generated by a subpixel motion compensation using an N-tap interpolation on a plurality of first reference samples, (B) copying a first subset of the first reference samples from the main memory to an internal memory, (C) generating a first decode block using the subpixel motion compensation with an M-tap interpolation on the first subset in the internal memory, and (D) reconstructing a first original block by adding the first residual block to the first decode block.

21 Claims, 5 Drawing Sheets

US 8,170,107 B2

FLEXIBLE REDUCED BANDWIDTH COMPRESSED VIDEO DECODER

FIELD OF THE INVENTION

The present invention relates to digital video decoding generally and, more particularly, to a method and/or apparatus for implementing a flexible reduced bandwidth compressed video decode.

BACKGROUND OF THE INVENTION

Decoding compressed video is typically expensive in terms of a dynamic random access memory (DRAM) bandwidth. Newer codecs use more bandwidth than established codecs due to smaller block sizes (i.e., down to 4×4 blocks instead of 16×16 blocks), larger video formats (i.e., high definition) and more accurate subpixel interpolations (i.e., 6-tap interpolations instead of 2-tap interpolations). Existing approaches to deal with the DRAM bandwidth problem in decoders include lossy methods (i.e., compressing or subsampling reference data and dropping fields or frames) and lossless methods (i.e., storing reference frames or portions thereof in on-chip caches).

Existing lossless methods introduce significant cost by implementing large on-chip caches. Existing lossy methods introduce drift (errors) in the decoded video, as the current lossy methods involve modifying the reference data. For newer codecs (i.e., H.264/MPEG4-AVC) the errors introduced by existing lossy methods are significantly exasperated by recursive in-loop deblocking filtering and recursive intra in-picture prediction from reconstructed pixels. As such, existing lossy methods are visually unacceptable for some newer codecs. Conventional methods using subsampling and reference frame compression can result in memory storage reduction, but often fail to give any significant worst-case memory bandwidth savings in practice, depending on the specific method, memory architecture and codec.

SUMMARY OF THE INVENTION

The present invention concerns a method of decoding a video bitstream. The method generally includes the steps of (A) buffering the video bitstream in a main memory, the video bitstream comprising a first residual block based on a first motion compensated block, the first motion compensated block having been generated by a subpixel motion compensation using an N-tap interpolation on a plurality of first reference samples, (B) copying a first subset of the first reference samples from the main memory to an internal memory, (C) generating a first decode block using the subpixel motion compensation with an M-tap interpolation on the first subset in the internal memory, and (D) reconstructing a first original block by adding the first residual block to the first decode block.

The objects, features and advantages of the present invention include providing a method and/or apparatus for implementing a flexible reduced bandwidth compressed video decode that may (i) reduce memory bandwidth consumption to an external memory, (ii) leave the reference data unmodified, (iii) dynamically alter the amount of memory bandwidth reduction, (iv) use fewer taps in a decoding interpolation than the taps used in an encoding interpolation for motion compensation and/or (v) provide a low-cost implementation of a decoder,

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
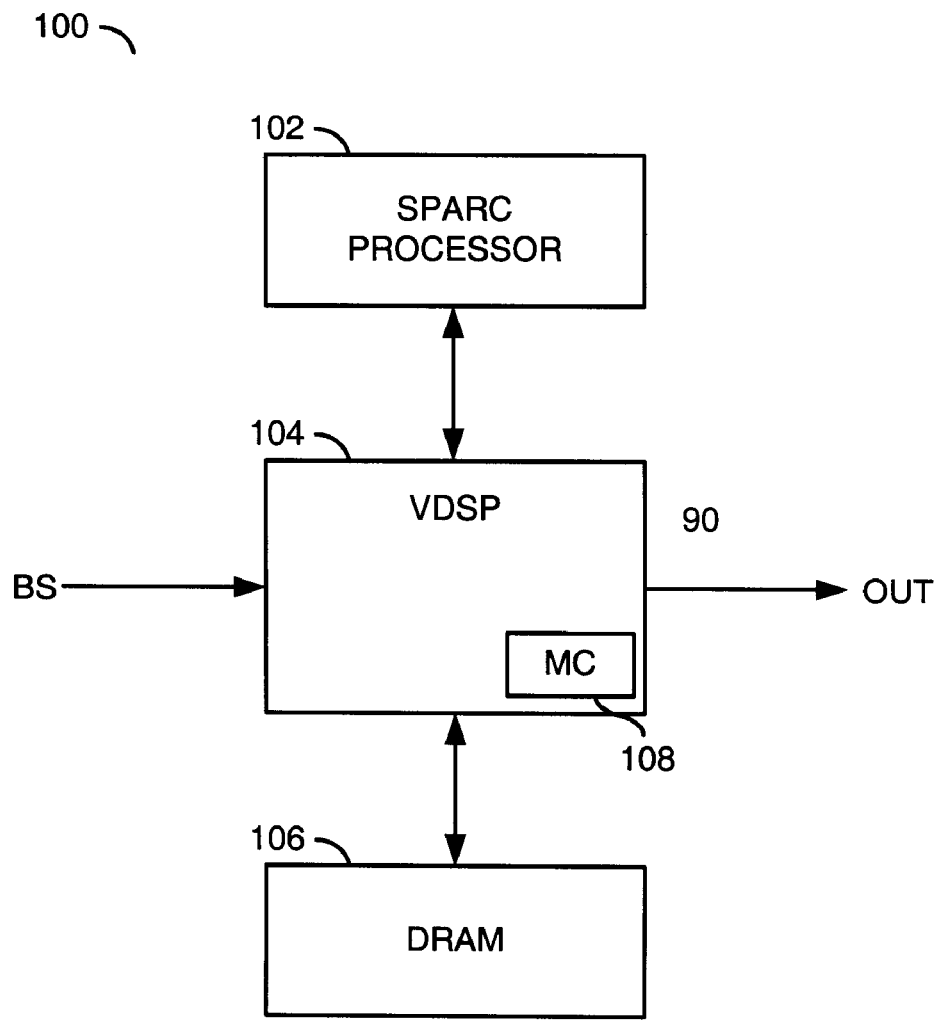
FIG. 1 is a block diagram of an example implementation of a system in accordance with a preferred embodiment of the present invention.

Referring to FIG. 1, a block diagram of an example implementation of a system 100 in accordance with a preferred embodiment of the present invention is shown. The system (or apparatus) 100 may implement a video decoder. The system 100 generally comprises a circuit (or module) 102, a circuit (or module) 104 and a circuit (or module) 106. The circuit 104 may be directly coupled to the circuit 102 and the circuit 106. A signal (e.g., BS) may be received by the circuit 104. A signal (e.g., OUT) may be presented by the circuit 104.

The signal BS may be a compressed video signal, generally referred to as a bitstream. The signal BS may comprise a sequence of progressive-format frames and/or interlace-format fields. The signal BS may be compliant with a VC-1, MPEG and/or H.26x standard. The MPEG/H.26x standards generally include H.261, H.264, H.263, MPEG-1, MPEG-2, MPEG-4 and H.264/AVC. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The signal OUT may be one or more analog video signals and/or one or more digital video signals. The signal OUT generally comprises a sequence of progressive-format frames and/or interlace-format fields. The signal OUT may include synchronization signals suitable for synchronizing a display with the video information. The signal OUT may be generated in analog form as, but is not limited to, an RGB (Red, Green, Blue) signal, an EIA-770 (e.g., YCrCb) signal, an S-video signal and/or a Composite Video Baseband Signal (CVBS). In digital form, the signal OUT may be generated as, but is not limited to, a High Definition Multimedia Interface (HDMI) signal, a Digital Video Interface (DVI) signal and/or a BT.656 signal. The signal OUT may be formatted as a standard definition signal or a high definition signal.

The circuit 102 may be implemented as a SPARC processor. The circuit 102 may be operational to perform select digital video decoding operations. Decoding may be compatible with the VC-1, MPEG or H.26x standards. The circuit 102 may also be operational to control the circuit 104. Other types of processors may be implemented to meet the criteria of a particular application.

The circuit 104 may be implemented as a video digital signal processor (VDSP) circuit. The circuit 104 may be operational to perform additional digital video decoding operations. The circuit 104 may be controlled by the circuit 102.

The circuit 106 may be implemented as a dynamic random access memory (DRAM). The memory 106 may be operational to store or buffer large amounts of information consumed and generated by the decoding operations and the filtering operations of the system 100. As such, the circuit 106 may be referred to as a main memory. The memory 106 may be implemented as a double data rate (DDR) memory. Other memory technologies may be implemented to meet the criteria of a particular application.

The circuit 104 generally includes a circuit (or module) 108. The circuit 108 generally implements a motion compensation (MC) circuit. The circuit 108 may be operational to perform motion compensation of reference samples read from the memory 106 at integer-pel positions to create reference data at subpel (e.g., half-pel and quarter-pel) positions.

Figure 2:
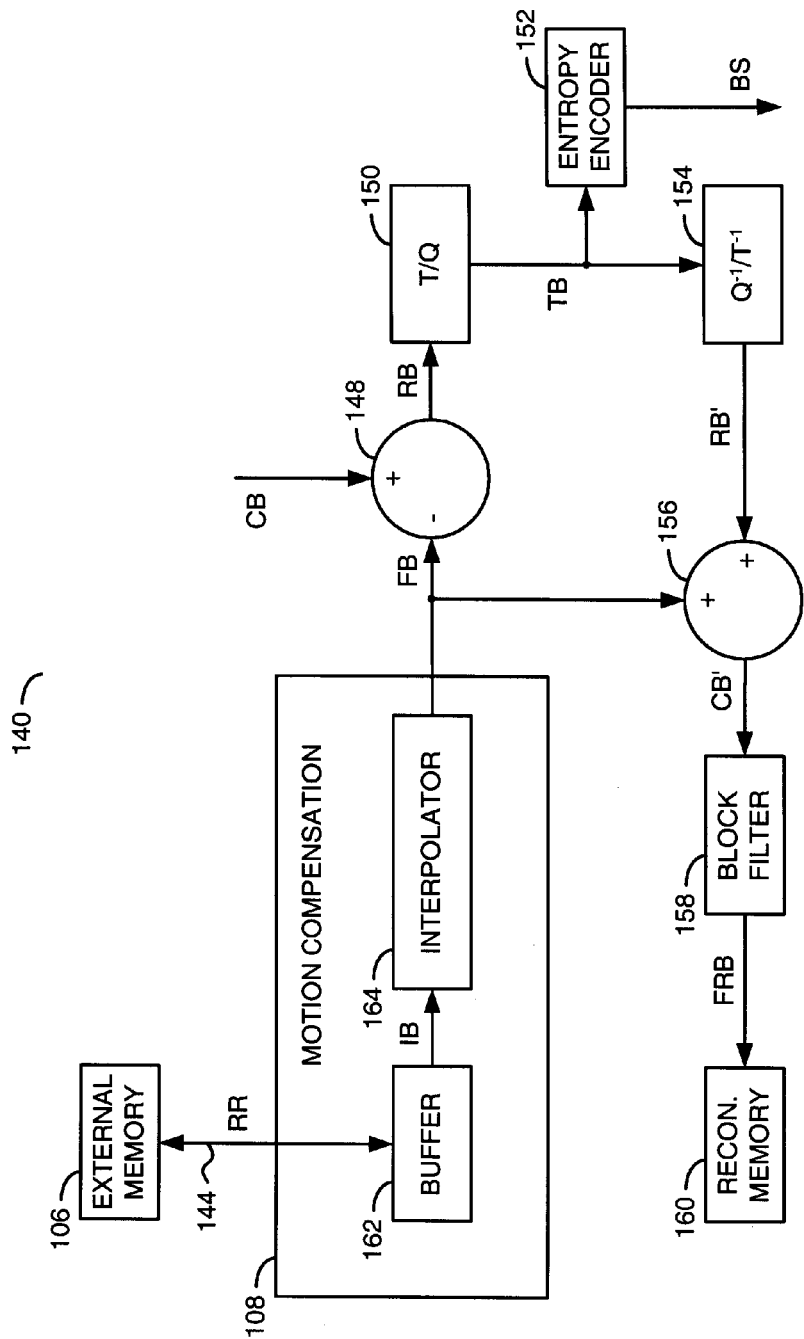
FIG. 2 is a functional block diagram of an example implementation of a portion of an encoder system.

Referring to FIG. 2, a functional block diagram of an example implementation of a portion 140 of an encoder system is shown. In some embodiments, the encoder system may be implemented with the system 100. Similar functioning elements in both the system 100 and the portion 140 may have the same reference numbers.

The portion 140 generally comprises a copy of the memory 106, a copy of the circuit 108, a bus 144, a circuit (or module) 148, a circuit (or module) 150, a circuit (or module) 152, a circuit (or module) 154, an adder circuit (or module) 156, a circuit (or module) 158 and a circuit (or module) 160.

A signal (e.g., RR) may exchange pixel samples and other data between the memory 106 and the circuit 108 via the bus 144. A signal (e.g., FB) may be generated by the circuit 108 and presented to a subtracting input of the circuit 148 and an adding input of the circuit 156. The circuit 148 may also receive a signal (e.g., CB) at an adding input. A signal (e.g., RB) may be created by the circuit 148 and presented to the circuit 150. The circuit 150 may generate and present a signal (e.g., TB) to both the circuit 152 and the circuit 154. The signal BS may be generated by the circuit 152. The circuit 154 may generate a signal (e.g., RB') that is received by an adding input of the circuit 156. A signal (e.g., CB') may be created by the circuit 156 and presented to the circuit 158. The circuit 158 may generate a signal (e.g., FRB) that is received by the circuit 160.

The encoder system is generally operational to generate the signal BS by compressing blocks of uncompressed video data samples based on reference frames buffered in the memory 106. The reference frames generally comprise integer-pel level pixel data. The encoding may be compatible with the VC-1, MPEG or H.26x standards.

The circuit 148 generally implements a subtractor. The circuit 148 may be operational to subtract an interpolated block received in the signal FB from a current block (input block) of video samples received in the signal CB to generate a residual block. The resulting residual block may be presented in the signal RB.

The circuit 150 may implement a transform/quantization circuit. The circuit 150 is generally operational to perform a discrete cosine transform operation and a quantization operation on the residual block received in the signal RB to generate a transformed block. The transformed block may be presented in the signal TB.

The circuit 152 generally implements an entropy encoder. The circuit 152 may be operational to reorder and entropy encode the transformed blocks received in the signal TB to generate encoded data. The circuit 152 may also be operational to present the encoded data and corresponding parameters in the signal BS.

The circuit 154 generally implements an inverse quantization/transform circuit. The circuit 154 may be operational to inverse quantize and perform an inverse discrete cosine transform on the transformed blocks to present reconstructed residual blocks. The reconstructed residual blocks may be presented in the signal RB'.

The circuit 156 may be implemented as an adder circuit. The circuit 156 generally adds the reconstructed residual blocks in the signal RB' to the interpolated blocks in the signal FB to generate reconstructed current blocks (output blocks). The reconstructed current blocks may be presented in the signal CB'.

The circuit 158 may implement a de-blocking filter. The circuit 158 is generally operational to perform de-block filtering of the reconstructed current blocks to generate filtered reconstructed blocks in the signal FRB. For codecs not implementing the de-blocking filter, the circuit 158 may be eliminated or bypassed.

The circuit 160 generally implements a memory circuit. The memory 160 may buffer the filtered reconstructed blocks awaiting possible transfer back to the memory 106 as part of a new reference frame.

The circuit 108 generally comprises a circuit (or module) 162 and a circuit (or module) 164. The circuit may receive the signal RR. A signal (e.g., IB) may be generated by the circuit 162 and presented to the circuit 164. The circuit 164 may create the signal FB.

The circuit 162 may implement a memory. The circuit 162 is generally operational to buffer reference sample data received from the memory 106. The memory 162 may be referred to as an internal memory. The reference samples may be transferred to the circuit 164 in the signal IB.

The circuit 164 may implement an interpolation filter. The circuit 164 is generally operational to interpolate the reference samples held in the memory 106 to achieve motion compensation. The circuit 164 may be dynamically programmable to alter the type of interpolation being performed on-the-fly. In some embodiments, the circuit 164 may be programmed to implement an 8-tap interpolation filter, a 6-tap interpolation filter, a 4-tap interpolation filter, a 2-tap interpolation filter, a 1-tap interpolation filter and a 0-tap interpolation filter. Other filter designs may be implemented to meet the criteria of a particular application.

The encoder system generally performs an inter-frame predicted compression a current block of video by performing a motion estimation of the current block relative to one or more reference frames. Once the motion had been determined, an appropriate reference block of reference samples (e.g., a block of luminance samples) and some of the surrounding reference samples may be copied from the memory 106 to the memory 162. The circuit 164 then either (i) performs the motion compensation on the reference samples in accordance with the detected motion or (ii) passes the reference block unaltered through to the signal FB where no motion compensation is applied. The motion compensated block is then subtracted from the current block to create the residual block. The residual block may be transformed, quantized and entropy encoded to create the signal BS.

Figure 3:
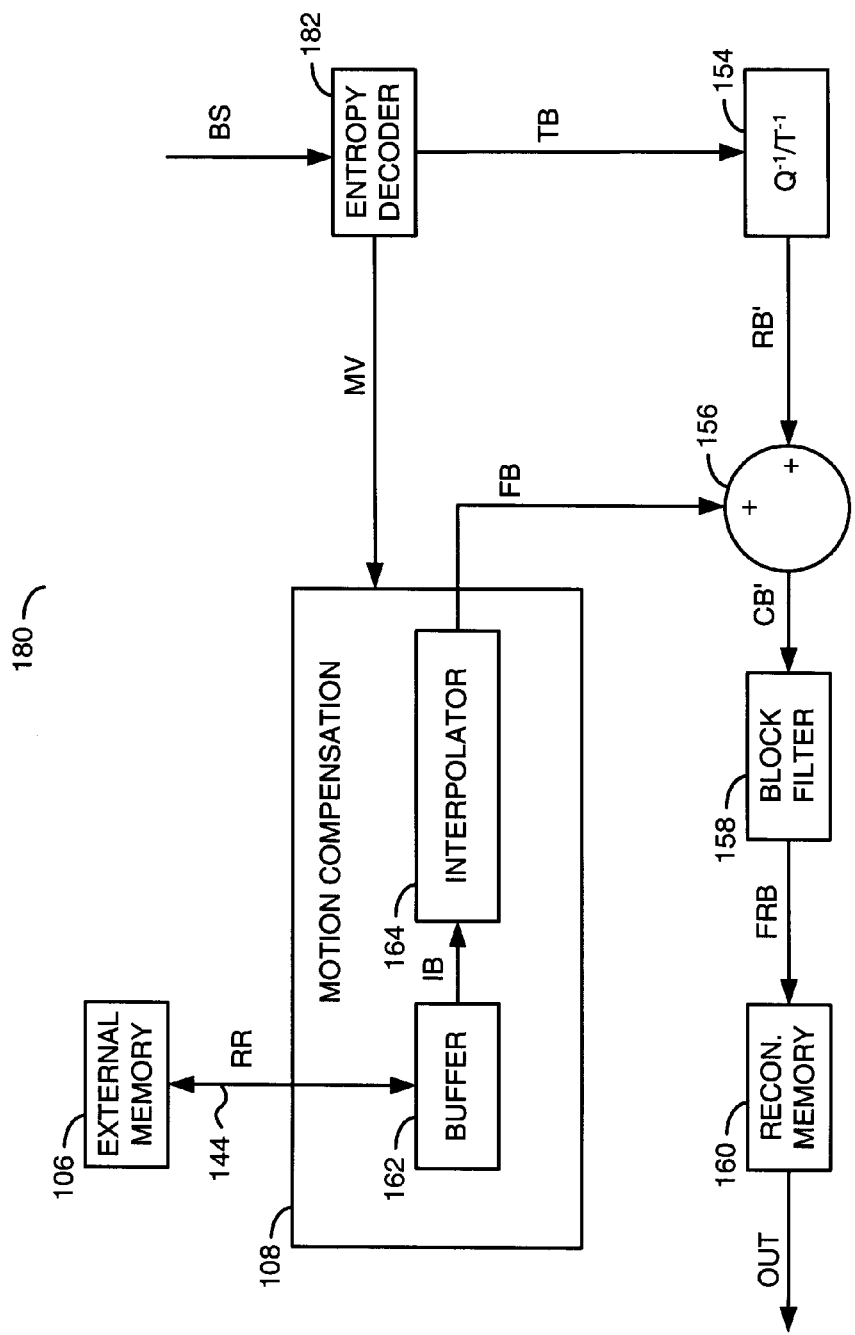
FIG. 3 is a functional block diagram of an example implementation of a portion of a decoder system.

Referring to FIG. 3, a functional block diagram of an example implementation of a portion 180 of a decoder system is shown. The portion 180 generally implements a motion compensation and feedback path similar to that of the portion 140. Similar functioning elements in the system 100, the portion 140 and the portion 180 may have the same reference numbers.

The portion 180 generally comprises the memory 106, the bus 144, the circuit 108, the circuit 154, the circuit 156, the circuit 158, the memory 160 and circuit (or module) 182. The signal BS may be received by the circuit 182. The circuit 108 generally comprises the circuit 162 and the circuit 164. The signal OUT may be generated and presented by the circuit 160.

The circuit 182 generally implements an entropy decoder. The circuit 182 may be operational to perform an entropy decode and reorder on the encoded blocks in the signal BS. During the decoding, the circuit 182 may recover motion vector information from the signal BS. The motion vectors may be presented to the circuit 108 via a signal (e.g., MV). Some of the motion vector values may have integer-pel resolutions and other motion vector values may have subpel resolutions.

The system 140 generally performs a decoding of the compressed data in the signal BS by entropy decoding the signal BS to generate the reconstructed transform blocks in the signal TB. The circuit 154 may then inverse quantize and inverse transform the reconstructed transformed blocks to present the reconstructed residual blocks in the signal RB'.

The circuit 108 may receive (i) reference samples suitable for motion compensation from the memory 106 via the bus 144 and (ii) motion vectors via the signal MV. The circuit 108 may then generate the interpolated blocks in the signal FB. The circuit 156 may add the interpolated blocks to the reconstructed residual blocks to present the reconstructed current blocks in the signal CB'. The circuit 158 generally de-block filters the reconstructed current blocks to present the filtered reconstructed blocks in the signal FRB. The memory 160 may buffer the filtered reconstructed blocks awaiting (i) output for display via the signal OUT and (ii) possible transfer back to the memory 106 as part of a new reference frame.

Figure 4:
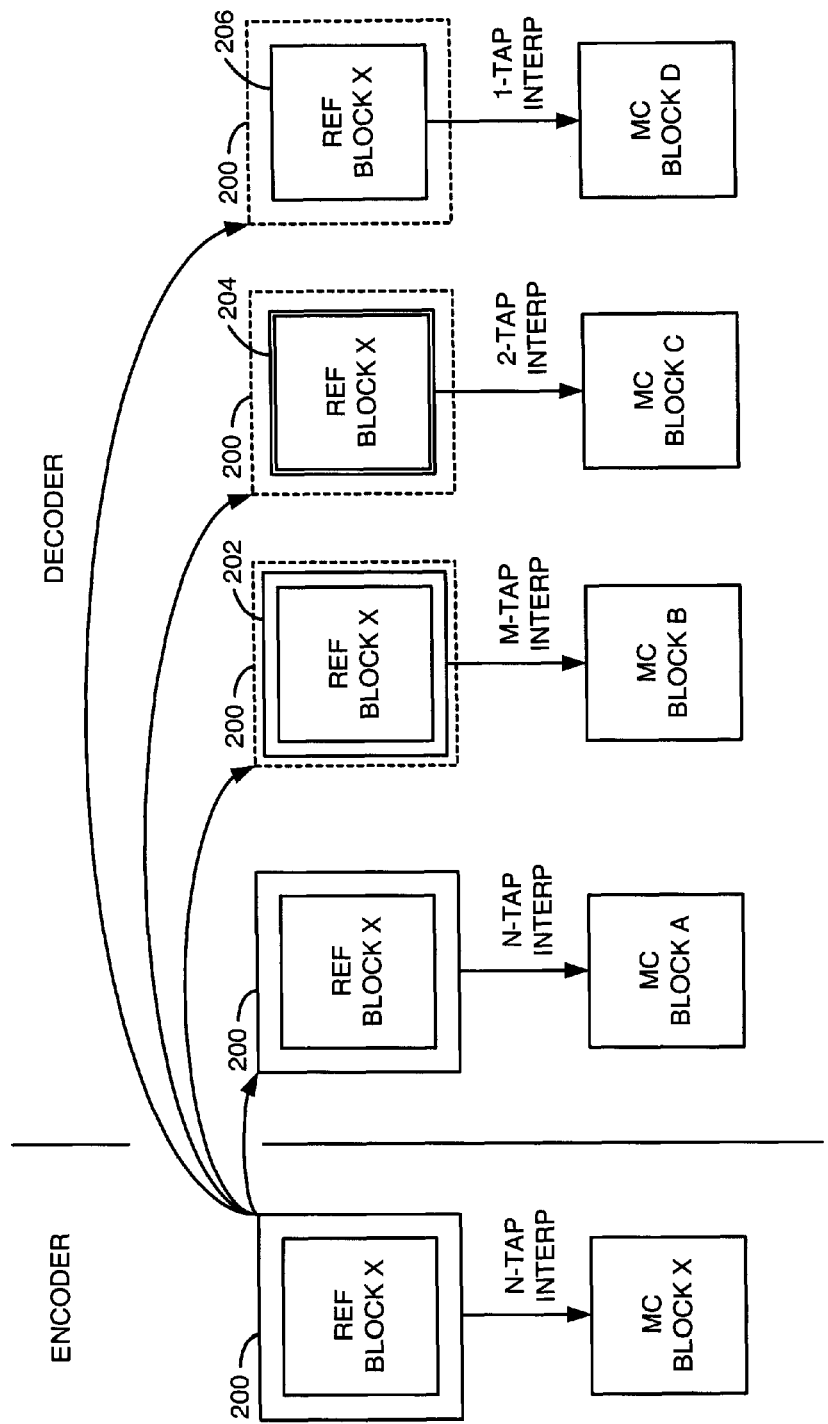
FIG. 4 is a diagram of example motion compensation interpolations of a reference block in both an encoder and a decoder.

Referring to FIG. 4, a diagram of example motion compensation interpolations of a reference block in both an encoder and a decoder is shown. Although the example illustrates a single reference block (e.g., block X), the motion compensation is generally applied to multiple blocks during the course of decoding a compressed video bitstream.

The interpolation method of the present invention may be a lossy method at some times and a lossless method at other times. The interpolation method generally does not modify the reference samples that are stored in the memory 106 for use in decompression. Instead, the present invention generally modifies a manner in which the reference samples are accessed from the memory 106. As such, the interpolation method may not result in memory storage savings, as do some other lossy methods (e.g., by subsampling the reference data), but does save memory bandwidth in a direct manner.

The interpolation filtering performed by the circuit 164 for subpixel motion compensation may be approximated from the interpolation filtering specified in the standard decoding semantics. For example, an 8-tap interpolator may be approximated by a 6-tap interpolator, 4-tap interpolator, a 2-tap interpolator, a 1-tap (e.g., spatial shift of integer samples without modification) interpolator or a 0-tap (e.g., constant value) interpolator. Generally, an N-tap interpolator used in the encoding may be approximated by an M-tap interpolator in the decoding, where $N \geq M$.

Consider an N-tap interpolation filter implemented in an encoder. Interpolating a reference block X generally involves filtering the reference samples within the reference block X and several boundary reference samples (e.g., the region 200) surrounding the reference block X. The resulting motion compensated (MC) block X may have the same dimensions as the starting reference block X, but with a subpixel spatial offset from the position of the starting reference block X within the reference frame.

At the decoder, an N-tap interpolation may be performed on the reference block X and the surrounding reference samples in the region 200 to create a motion compensated block A. If the N-tap interpolation conducted in the decoder is the same as the N-tap interpolation conducted in the encoder (e.g., N=M), the MC block A may match the MC block X resulting in a lossless operation. The lossless operation may be useful when reconstructing blocks that become a part of a new reference frame.

If the number of taps used in the decoder interpolation (e.g., M-taps) is programmed to be less than the number of taps used in the encoding interpolation (e.g., N>M), the number of boundary reference samples used in the interpolation may be reduced. For example, only the boundary samples in a region 202 adjacent to the reference block X may be transferred from the memory 106 to the memory 162. Since the region 202 is smaller than the region 200, fewer reference samples are generally transferred thereby reducing the memory bandwidth consumed by the motion compensation operation.

Because the number of taps used by the circuit 164 may be programmable, the motion compensation process may be dynamically changed in real time. Programming of the number of taps used in the filtering may be changed as often as each individual block being motion compensated. For example, some reference blocks may undergo an 8-tap interpolation, other reference blocks may see a 6-tap interpolation, a 4-tap interpolation, a 2-tap interpolation, and still other reference blocks may be subject to a 1-tap interpolation or a 0-tap interpolation.

Each reduction in the value of M in the M-tap interpolation may introduce slightly more error in the motion compensation for blocks with some subpel motion vectors. For example, the region 202 may be smaller than the region 200 and the region 204 may be smaller than the region 202. The 1-tap interpolation may utilize an empty set of boundary reference samples around the reference block X and transfer only the reference samples within the region 206 that defines the reference block X identified by the motion vector. Since each reduction generally reduces the number of reference samples that are fetched from the memory 106, fewer interpolator taps mean fewer boundary reference samples beyond a basic size of the reference block. The fewer number of reference samples used in the decoding generally results in a greater chance that the given MC block may be different than the encoder MC block X.

Figure 5:
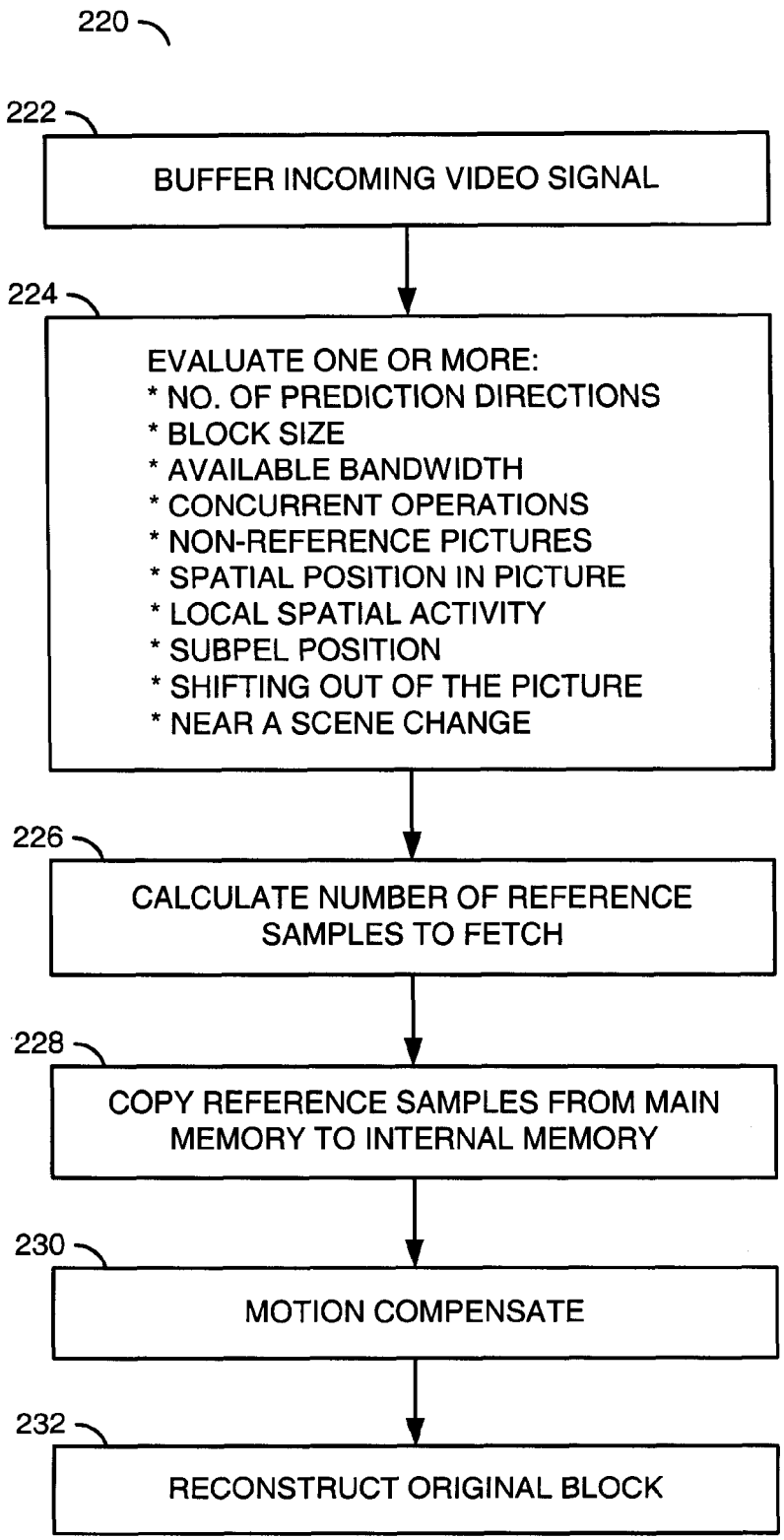
FIG. 5 is a flow diagram of an example implementation of a method of a flexible interpolation.

Referring to FIG. 5, a flow diagram of an example implementation of a method 220 of a flexible interpolation is shown. The method (or process) 220 may be implemented by the system 100. The method 220 generally comprises a step (or block) 222, a step (or block) 224, a step (or block) 226, a step (or block) 228, a step (or block) 230 and a step (or block) 232.

In the step 222, the memory 106 may buffer the compressed video data received in the signal BS. After processing at least one inter-coded picture (e.g., a frame or a field), a reference picture may be available in the memory 106. The system 100 may then evaluate the conditions of one or more of the hardware, the software, the reconstructed blocks and/or the next residual block to be processed to dynamically determine the number of taps to be used in generating a corresponding motion compensated reference block in the step 224. The evaluation may take into account one or more of the following situations.

A process for bandwidth reduction may be performed to take into account the bandwidth demands of the video in one or more of several ways. In a deterministic/worst case analysis, high-bandwidth picture and/or worst-case blocks may be evaluated. The high-bandwidth pictures and/or blocks (e.g., bidirectionally predicted pictures or multidirectionally predicted pictures) may be bandwidth-reduced to a greater degree than low-bandwidth pictures and/or blocks (e.g., unidirectionally predicted pictures). The worst-case blocks (e.g., small blocks, macroblocks with many small blocks, or block with unidirectionally predicted partitions) may be bandwidth-reduced to a greater degree than non-worst-case blocks (e.g., larger blocks, unpartitioned blocks, or bidirectionally predicted).

On-the-fly realtime analysis may be performed as part of the evaluation. In particular, bandwidth-reduction may be dynamically adjusted in each of one or more decoders in a multi-decoder system depending on the dynamically available bandwidth in the system. Furthermore, the bandwidth reduction may be adjusted based on a worst-case budget for each independent operation in a multi-operation system based on any concurrent scenarios in progress. For example, performing two high-definition H.264 decodes simultaneously with Blu-ray Disk™ graphics may result in a different bandwidth reduction than performing a single standard-definition H.264 decode and a single standard-definition H.264 encode simultaneously. (Blu-ray Disk™ is a trademark of the Blu-ray Disc Association, Tokyo, Japan.)

The evaluation may take into account the types of pictures being decoded. For example, non-reference pictures may be preferred for more aggressive bandwidth reduction than reference pictures. Errors introduced into non-reference pictures by the bandwidth reduction generally will not propagate forward into future pictures.

More bandwidth reduction may be performed towards the bottom of an H.264 picture or a VC-1 picture than at the top of the picture. The intra-prediction method used in H.264, and with the in-loop deblocking filters used in H.264 and VC-1, generally propagates errors from the top of a picture towards the bottom. Therefore, blocks spatially nearer the bottom of the pictures may be preferred for more aggressive bandwidth reduction than block spatially nearer the tops of the pictures.

Since subpel approximations introduce less error in low spatial activity (e.g., flat) blocks than in high spatial activity (e.g., texture) blocks, bandwidth reduction may be based on block content, which blocks to approximate and to what degree, in order to minimize drift and/or visual errors. For example, if one or more neighboring blocks already decoded suggest that the current residual block being decoded may result in a reconstructed block with a smooth texture, an aggressive bandwidth reduction may be employed during the decoding. If the neighboring blocks suggest high spatially activity, the decoding may utilize a less-aggressive bandwidth reduction.

Blocks at certain subpel positions (e.g., quarter-pel positions) typically consume more bandwidth and subpel-taps during motion compensation. To reduce the overall bandwidth consumed, the motion compensation at the certain subpel positions may be preferentially bandwidth reduced.

Blocks that are shifting off the screen, or exist in pictures shortly before a scene change are generally not used in future reference pictures. Therefore, some to all such blocks in one or more pre-scene-change pictures may be targeted for greater bandwidth reduction. Other evaluation conditions may be implemented to meet the criteria of a particular application.

In the step 226, the circuit 104 (or the circuit 102) may calculate the number of reference samples to be fetched from the memory 106 based on the results of the evaluation. The appropriate reference samples may then be copied from the memory 106 to the memory 162 in the step 228. In the step 230, the circuit 164 may perform motion compensation on the reference samples buffered in the memory 162 to create a motion compensated block in the signal FB. The circuit 156 may add the motion compensated block to the corresponding residual block in the step 232 to reconstruct the original block.

The present invention generally provides a high granularity and highly flexible method to control the external memory bandwidth consumed by a video decoder. The present invention may apply the bandwidth reduction to various subsets of the blocks, whereas existing techniques typically attempt to reduce the bandwidth for all blocks that are fetched for motion compensation.

The present invention may also result in low-cost decoders. Typically, multicodec decoders already support many different subpel interpolators for different standards. By applying the present invention, the interpolators of codec standards that use a few taps may be reused for other codec standards that specify more taps. Furthermore, if the decoder hardware is general purpose, similar but more accurate approximating subpel filters with fewer taps may be implemented for the motion compensation.

Regarding newer codecs (e.g., H.264), the worst-case bandwidth is typically much higher than as experienced in the older codecs (e.g., MPEG-2). However, decoders should be configured for the worst case scenario unless a graceful degradation scheme is available. Common strategies for situations when insufficient bandwidth is available include dropping non-reference frames. However, such strategies are visually noticeable. Furthermore, the present invention may give a finer granularity over bandwidth reduction than previous methods.

The present invention may work with highly optimized (e.g., tiled) reference memories. In contrast, many previous methods (some subsampling and many compression methods) do not work well with the highly optimized reference memories. Furthermore, the present invention may be relatively low-cost to implement.

The present invention may use subsampling instead of, or in addition to, the interpolation. In some architectures, subsampling may help save bandwidth. Consider a reference picture stored in the memory 106 at full resolution. Bandwidth reduction may be achieved by reading from the memory 106 for motion compensation in a subsampled fashion. Some reference blocks may be read subsampled and other reference blocks may be read in full, based on the various criteria mentioned above for choosing which blocks to approximate.

The functions performed by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method of decoding a video bitstream, comprising the steps of:
   (A) buffering said video bitstream in a main memory, said video bitstream comprising a first residual block based on a first motion compensated block, said first motion compensated block having been generated by a subpixel motion compensation using an N-tap interpolation on a plurality of first reference samples;
   (B) copying a first subset of said first reference samples from said main memory to an internal memory;
   (C) generating a first decode block using said subpixel motion compensation with an M-tap interpolation on said first subset in said internal memory;
   (D) reconstructing a first original block by adding said first residual block to said first decode block; and;
   copying a second subset of a plurality of second reference samples from said main memory to said internal memory, said second subset being smaller in number than said first subset.

2. The method according to claim 1, wherein (i) said M-tap interpolation uses fewer taps in number than said N-tap interpolation and (ii) N is at least two.

3. The method according to claim 1, wherein (i) said first subset matches said first residual block both in size and shape and (ii) said M-tap interpolation shifts without modification said first subset from an integer-pel position to a subpel position.

4. The method according to claim 1, wherein said video bitstream further comprises a second residual block, said second residual block encoding a second difference based on a second motion compensated block, said second motion compensated block having been generated by said subpixel motion compensation using said N-tap interpolation on a plurality of second reference samples.

5. The method according to claim 4, wherein said second residual block is predicted in more directions than said first residual block.

6. The method according to claim 4, wherein said second residual block is spatially smaller than said first residual block.

7. The method according to claim 4, wherein said second residual block is vertically lower in an original picture than said first residual block.

8. The method according to claim 4, further comprising the step of:
   generating a second decode block using said subpixel motion compensation with said M-tap interpolation on said second subset in said internal memory, wherein said second decode block is on a quarter-pel location and said first decode block is on a half-pel location.

9. The method according to claim 1, further comprising the steps of:
   calculating an available bandwidth of said main memory; and
   adjusting a size of said first in response to said available bandwidth.

10. The method according to claim 1, further comprising the steps of:
    calculating a budget allocation between decoding said video bitstream and performing another operation concurrently; and
    adjusting a size of said first set in response to said budget allocation.

11. The method according to claim 1, wherein said first original block as reconstructed is part of a non-reference picture.

12. The method according to claim 1, further comprising the steps of:
    calculating a texture of a reconstructed block adjacent said first residual block; and
    adjusting a size of said first set in response to said texture.

13. The method according to claim 1, wherein (i) said first original block is part of a picture and (ii) a motion vector corresponding to said first original block indicates that said first original block is shifting out of said picture.

14. The method according to claim 1, further comprising the steps of:
    (E) detecting an onset of a scene change; and
    (F) reducing a size of said first subset in response to said onset of said scene change.

15. The method according to claim 1, wherein the step of copy comprises the sub-step of:
    subsampling said first reference samples to create said first subset.

16. A circuit comprising:
    a main memory configured to buffer a video bitstream, said video bitstream comprising a first residual block based on a first motion compensated block, said first motion compensated block having been generated by a subpixel motion compensation using an N-tap interpolation on a plurality of first reference samples; and
    a processor having an internal memory, said processor being configured to (i) copy a first subset of said first reference samples from said main memory to said internal memory, (ii) generate a first decode block using said subpixel motion compensation with an M-tap interpolation on said first subset in said internal memory and (iii) reconstruct a first original block by adding said first residual block to said first decode block, wherein (i) said video bitstream further comprises a second residual block based on a second motion compensated block, said second motion compensated block having been generated by said subpixel motion compensation using said N-tap interpolation performed on a plurality of second reference samples and (ii) said processor is further configured to copy a second subset of said second reference samples from said main memory to said internal memory, said second subset being smaller in number than said first subset.

17. The circuit according to claim 16, wherein (i) said M-tap interpolation uses fewer taps in number than said N-tap interpolation and (ii) N is at least two.

18. The circuit according to claim 16, wherein (i) said first subset matches said first residual block both in size and shape and (ii) said M-tap interpolation shifts without modification said first subset from an integer-pel position to a subpel position.

19. The circuit according to claim 16, wherein (i) said video bitstream further comprises a second residual block based on a second motion compensated block, said second motion compensated block having been generated by said subpixel motion compensation using said N-tap interpolation performed on a plurality of second reference samples and (ii) said processor is further configured to copy a second subset of said second reference samples from said main memory to said internal memory, said second subset being smaller in number than said first subset.

20. A method of decoding a video bitstream, comprising the steps of:
    (A) buffering said video bitstream in a main memory, said video bitstream comprising a first residual block based on a first motion compensated block and a second residual block, said first motion compensated block having been generated by a subpixel motion compensation using an N-tap interpolation on a plurality of first reference samples;
    (B) copying a first subset of said first reference samples from said main memory to an internal memory;
    (C) generating a first decode block using said subpixel motion compensation with an M-tap interpolation on said first subset in said internal memory;
    (D) reconstructing a first original block by adding said first residual block to said first decode block, said second residual block encoding a second difference based on a second motion compensated block, said second motion compensated block having been generated by said subpixel motion compensation using said N-tap interpolation on a plurality of second reference samples; and
    (E) copying a second subset of said second reference samples from said main memory to said internal memory, said second subset being smaller in number than said first subset.

21. The method according to claim 20, further comprising the steps of:
    detecting an onset of a scene change; and
    reducing a size of said first subset in response to said onset of said scene change.

\* \* \* \* \*